(12) United States Patent
Reilly

(10) Patent No.: US 6,679,197 B1
(45) Date of Patent: Jan. 20, 2004

(54) THISTLE SEED SMALL BIRD FEEDER DISPLAYING NUMEROUS FINCHES AT ONE TIME

(76) Inventor: Wayne P Reilly, 161 Morgan La., Osterberg, PA (US) 16667

( * ) Notice: Subject to any disclaimer, the term of this patent is extended or adjusted under 35 U.S.C. 154(b) by 0 days.

(21) Appl. No.: 10/291,335

(22) Filed: Nov. 9, 2002

(51) Int. Cl.$^7$ .......................... A01K 39/00; A01K 39/01
(52) U.S. Cl. ..................................... 119/57.8; 119/52.2
(58) Field of Search ............................... 119/52.4, 52.2, 119/57.8

(56) References Cited

U.S. PATENT DOCUMENTS

| | | | |
|---|---|---|---|
| 5,016,573 A | * 5/1991 | Power | 119/57.8 |
| 5,740,758 A | * 4/1998 | Damm | 119/57.8 |
| 5,758,596 A | * 6/1998 | Loiselle | 119/52.2 |
| 5,826,539 A | * 10/1998 | Bloedorn | 119/52.2 |
| 5,970,913 A | * 10/1999 | Bloedorn | 119/57.8 |
| 6,067,934 A | * 5/2000 | Harwich | 119/57.8 |
| 6,332,427 B1 | * 12/2001 | Coulson | 119/57.8 |
| 6,532,896 B1 | * 3/2003 | Hurlbert | 119/57.8 |

* cited by examiner

*Primary Examiner*—Charles T. Jordan
*Assistant Examiner*—Elizabeth Shaw
(74) *Attorney, Agent, or Firm*—Roberts Nathans

(57) ABSTRACT

An easy to clean, flexible plastic mesh thistle seed containing sack provides a broad substantially planar surface for simultaneously viewing a surprisingly large number of colorful birds. Its mesh openings are configured to enable perching of small birds during feeding, and several substantially separated discrete centrally positioned feeding apertures are dimensioned to make it easy for the birds to feed, to keep them at the feeder, and yet without wasting of tiny thistle seed. An opening is formed within an upper portion of the flexible mesh thistle seed containing sack for inserting seed therein, and a closure member is seated over the opening, providing easy access for refilling of seed. The closure member remains seated upon the top of the sack by gravity and yet can be readily displaced upwardly for gaining access to the sack. The closure member at the same time also functions as a bird supporting perch.

20 Claims, 2 Drawing Sheets

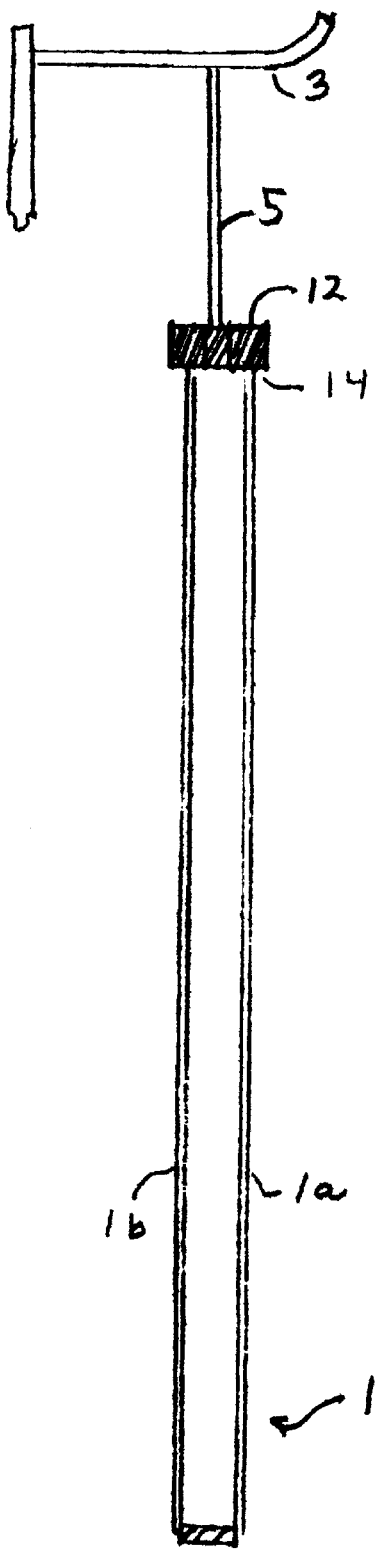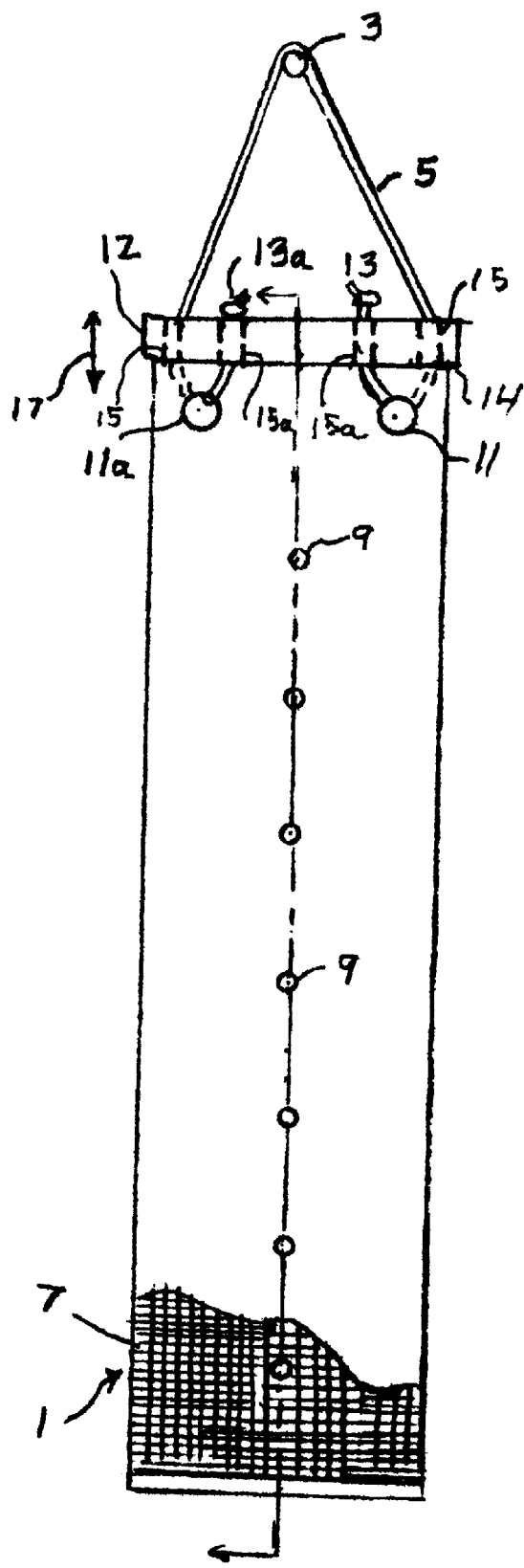
FIG 2
FIG. 1

THISTLE SEED SMALL BIRD FEEDER DISPLAYING NUMEROUS FINCHES AT ONE TIME

BACKGROUND OF THE INVENTION

The present invention relates to the field of bird feeders.

A thistle seed small bird feeder is needed in the marketplace that needs no assembly upon purchase, can be readily kept clean, is easy to refill, does not waste seed, and most importantly, that provides simultaneous dramatic viewing and display of a substantial number of small birds such as finches.

The market place is filled with hype, and feed and feeders, generally offered for sale, trap the unwary uninformed aviculturist into believing that little birds will feed next to larger birds, that birds love cracked corn, artificially colored seeds make them more desirable, that mixing different varieties of seeds will attract lots of different birds, that a feeding station with three separate feeding compartments for different offerings of seed in each will actually attract many birds. My novel small bird feeder helps to eliminate many of the drawbacks and disadvantages of prior art bird feeders.

Thistle (Guizotia *Abyssinica-niger* seed) is a very tiny elongated tear drop shaped oil seed. I have experimented with dispensing of this type of seed during small bird feeding. As such, it is a difficult seed to dispense from a feeder without birds wasting it. This is the type of seed one uses to attract small birds commonly classified as finches. Most thistle feeders in use are constructed of plastic, metal or combinations of both. There are cheesecloth type seed containing bags that are flimsy, (available to view on line at www.samsclub.com under the name of "Thistle Sock") become unsanitary and filthy, and have no easy access to discreet feeding stations displaced from one another to accommodate individual birds. The birds find it difficult to pull the seed through the bag, and their beaks quickly make holes through the material. The bags are short lived, and are designed as a cheap disposable feeders that become stained, discolored and maimed in a short period of time requiring replacement.

Bird feeders in general dispensing sunflower and mixed seed are shaped like houses, silos, the Empire State building, barns etc. These feeders that I have handled are generally awkward to use, with some or all of the following undesirable attributes: annoying to refill, discolor, difficult if not impossible to clean thoroughly, deteriorate by becoming cloudy, crack, split, fasteners rust, will give you welts or cuts on your head if you forget they are there and walk into them, and need assembly after purchase. Repeated pounding of beaks enlarges the small feed openings of some feeding stations, and most if not all are deficient in fully displaying and feeding their intended audience.

Importantly, birds being territorial by nature spend more time quibbling over a station than actually using it. This restricts the number of birds that may be viewed at one time for owners of birdfeeders that have conventional horizontal perches adjacent feeding orifices, one bird per perch at the most, in contrast with my novel small bird feeder that eliminates seed waste while encouraging and enabling numerous finches to feed together, without competing for particular perches.

U.S. Pat. No. 5,740,758 issued to Damm discloses a planar mesh screen having apertures of between 0.055 and 0.065 inches, that are used to accommodate the claws of birds to provide a perching area, and also to allegedly provide feeding openings for supplying thistle to finches. However, I have determined through experimentation, that these feeding openings are too small to readily enable satisfactory feeding and display of finches, in contrast with my "Thistle Sack" feeder that has far larger, spaced apart porthole-like feeding openings, aside from apertures within the mesh. If seed retrieval is too difficult, the birds will not remain at the feeder to feed and be displayed.

SUMMARY OF A PREFERRED EMBODIMENT OF THE INVENTION

A thistle seed bird feeder is provided for attracting, and enabling simultaneous viewing of a substantial number of small birds such as finches, all feeding together to yield an aesthetically pleasing "playground effect." Finches love the attributes of my novel small bird feeder, and bird lovers enjoy viewing interaction of mated pairs and their young. Small birds feeding from my feeder are noticeably more relaxed and spend more time on the feeder for viewing. Surprisingly, chickadees will eat the thistle in my feeder when no other birds are present, and I have never heard of chickadees eating thistle, and I have been in the pet business for many years. My novel "Thistle Sack" small bird feeder helps to eliminate many of the drawbacks and disadvantages of prior art bird feeders mentioned herein.

The feeder employs a flexible plastic mesh thistle seed containing sack having its length and width greater than its depth, to provide a broad roomy substantially planar perching surface for bird display. The seed containing sack has small openings in its walls of mesh, configured to enable perching of small birds thereon during feeding, together with several substantially separated discrete feeding apertures provided by eyelets or grommets in central sack portions, having diameters of about 0.145–0.165 inches, each feeding aperture being considerably larger than the bird supporting mesh openings. These apertures are small enough to prevent substantial waste of thistle seed during feeding and large enough to make it easy for the birds to feed, to thus maintain their presence. An opening is formed within an upper portion of the flexible mesh thistle seed containing sack for inserting seed therein, and a closure member is seated over the opening, providing easy access for refilling of seed. The closure member remains seated upon the top of the sack by force of gravity, and yet can be readily manually displaced upwardly for gaining access to the sack. The closure member makes the sack easy to hold and has the dual function of acting as a bird supporting perch.

The bird feeder is simple in construction, easy to mail, needs no assembly upon purchase, can be readily kept clean, is easy to refill, does not waste seed, and most importantly, provides simultaneous viewing and display of a substantial number of small birds such as finches. The preferred black color greatly enhances the color of the display. The open mesh weave allows the sack to be washed by rain and offers large amounts of thistle for each unit of surface area. As the feeder is predominately flat, it is easy and cheap to mail. The mesh openings permit viewing of the amount of seed remaining and the flexible mesh body is quite rigid to provide good support for the birds.

BRIEF DESCRIPTION OF THE DRAWINGS

Other features and advantages of the invention will become more apparent upon reading of the following detailed description, taken I conjunction with the drawings in which:

FIG. 1 shows a front view of a preferred single feeder;

FIG. 2 shows a side sectional view taken through the central portion of the feeder of FIG. 1.

DETAILED DESCRIPTION OF PREFERRED EMBODIMENTS OF THE INVENTION

Figure 3:
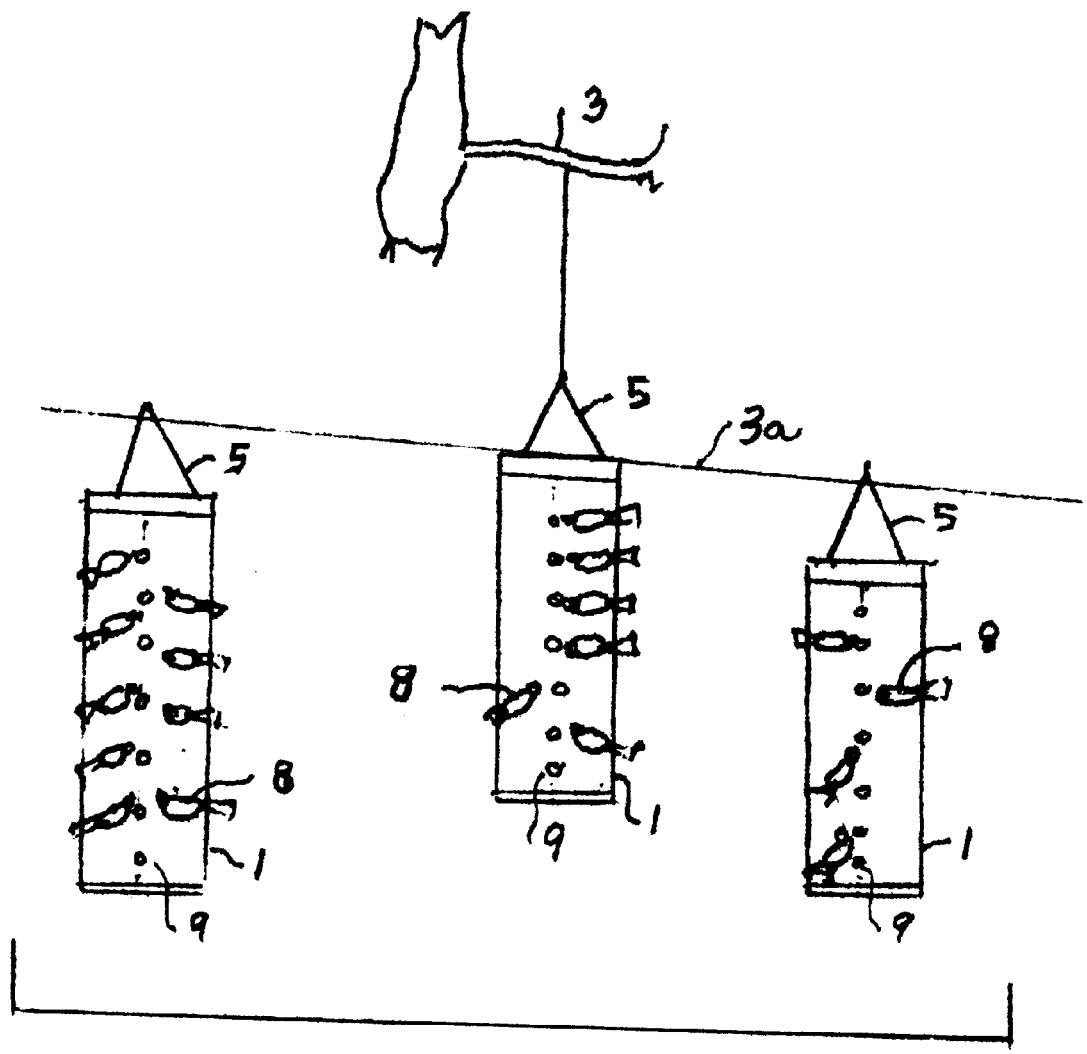
FIG. 3 shows a drawing based upon an actual photograph of three feeders accommodating nineteen finches simultaneously in the inventor's back yard.

Referring now to FIGS. 1 and 2, a flexible plastic mesh thistle seed containing sack 1 is supported by support member 3 and a thin rope 5 that passes through closure member 12 seated by gravity over top opening sack opening 14. The front and back rectangular sheet portions 1a and 1b of sack 1 are sealed together along three sides, and the sack 1 is made of a commercially available plastic mesh sheet having openings therein that are suitably sized and configured to receive the claws of small birds such as finches and chickadees and provide good support during feeding. I have found that rectangular openings having dimensions of about 0.035–0.045 based upon a 17×14 thread count/inch or 0.060–0.100 based upon a 17×11 thread count/inch work well. These are the thread counts of both sized sheet mesh materials available commercially. The shapes and dimensions are not too critical so long as they support the birds while feeding to their satisfaction. For larger birds, the mesh apertures would be substantially larger.

Eyelets or grommets 9 are formed within the front and optionally the rear mesh sheets 1a and 1b respectively, and provide the feeding apertures. I have found through experimentation that for thistle seed, each feeding aperture should ideally have a diameter of 0.145–0.165 inches, substantially larger than the sack claw support mesh openings, 0.160 inches being the presently most preferred inside diameter of each feeding grommet 9. At 0.185 inches in diameter, undesirable amounts of the tiny thistle seed falls out and is wasted. However, the inside grommet diameters could be within the range of about 0.145–0.165 inches for thistle seed to produce good results. If the inside grommet aperture diameter is much smaller, feeding will be too difficult and the impatient birds will depart. The preferred seed is widely available thistle seed that has typical dimensions of about 0.145–0.170 inches in length and 0.030–0.060 inches in width and depth. For larger birds that feed on larger seed such as sunflower seed, the feeding aperture sizes and mesh openings will be appropriately larger.

Preferably, the feeding aperture eyelets or grommets 9, are centrally positioned within the substantially planar broad front face of the sack as shown. This provides a broad front perching surface and plenty of room for numerous birds to feed together without fighting, due to their territorial natures. The happy result, aided by wide separation of the properly dimensioned feeding apertures, is a far more dramatic viewing scene for the bird lover than the view provided by typical bird feeders sold in the marketplace. The sack is preferably colored black to further enhance the visual color display.

The use of my novel feeder produces a playground for numerous birds, creating lots of interesting activity. FIG. 3 illustrates an array of three sacks, the outer ones being supported by clothesline 3a via ropes 5 and the inner sack being supported by a tree branch 3 via rope 5. FIG. 3 is a drawing of an actual photograph taken by the inventor illustrating typical results. Numerous birds 8 are shown upon the sacks, feeding from centrally positioned grommet apertures 9. Although the sizes and shapes of the feed sacks can vary widely, I currently prefer rectangular sacks having vertically oriented lengths of 24 inches, widths of about 6 inches and far smaller depths (into the plane of FIG. 3) of about 3.25 inches when filled with thistle seed. The feed containing sacks shown in FIG. 3 typically attract 15–20 birds feeding together to provide a dramatic display. If the back side has the same mesh structure as the front side, more birds can feed on the rear side to add to the display.

Referring back to FIG. 1, terminal portions of support rope 5 are passed through outer holes 15 drilled within closure member 12, grommets 11 and 11a formed within the sack, and inner holes 15a and are knotted at 13 and 13a. The closure member can be an ordinary rectangular wooden block seated over the top sack opening 14 by gravity to close the sack. Easy access to the sack interior is produced merely by manually lifting the closure member in an upward direction. When seed is added to the sack the closure block member 12 is pushed downwardly toward the top of the sack and is maintained against the top of the sack by gravity; these actions are indicated by arrow 17. Closure member 12 also functions as a perch for birds to rest upon to further enhance the view.

Since variations on the foregoing will readily be apparent to those skilled in the art, the scope of the invention is to be limited solely to the terms of the following claims and art recognized equivalents. For example the term "diameter" is intended to cover a major dimension of an aperture have a non-circular shape that could conceivably be employed in the practice of the invention. The feeder sacks could have shapes other than rectangular ones and could even be circular to simulate party balloons.

I claim:

1. A thistle seed small bird feeder for small birds comprising:

(a) a container comprising said small bird feeder, having a given length and width, for storing thistle seeds, said container having at least one broad roomy substantially planar perching surface enabling simultaneous viewing of a substantial number of small feeding birds and a depth smaller than the length and width of said small bird feeder for offering large amounts of accessible birdseed, said substantially planar perching surface having (b) a first set of numerous small perching openings, formed throughout substantial portions of said substantially planar perching surface, configured to support the claws of small birds while perching during feeding; and (c) a second of feeding apertures formed within said perching surface, each feeding aperture of said second set being considerably larger than said openings of said first set, to make it very easy for said small birds to feed to thus maintain their presence, and yet small enough to prevent substantial waste of birdseed during feeding.

2. The small bird feeder of claim 1 wherein said feeding apertures are widely seperated from one another to avoid crowding of feeding birds.

3. The small bird feeder of claim 2 wherein said feeding apertures have major dimensions of between 0.145 and 0.165 inches.

4. The small bird feeder of claim 3 wherein said feeding apertures have major dimensions of about 0.160 inches.

5. The small bird feeder of claim 2 wherein said feeding apertures are centrally positioned upon said planar perching surface.

6. The small bird feeder of claim 5 wherein said feeding apertures have major dimensions of between 0.145 and 0.165 inches.

7. The small bird feeder of claim 6 wherein said feeding apertures have major dimensions of about 0.160 inches.

8. The small bird feeder of claim 1 wherein said feeding apertures have major dimensions of between 0.145 and 0.165 inches.

9. The small bird feeder of claim 8 wherein said feeding apertures have major dimensions of about 0.160 inches.

10. A thistle seed small bird feeder for small birds comprising:
   (a) a container comprising said small bird feeder, having a given length and width, for containing thistle seeds, said container having a broad roomy substantially planar perching surface enabling simultaneous viewing of a substantial number of small feeding birds and a depth smaller than said length and width of said small bird feeder, for accordingly offering large amounts of accessible birdseed to feeding birds, said substantially planar perching surface having
   (b) a first set of numerous small rectangular perching openings, having dimensions of about 0.035–0.045 inches or alternatively dimensions of about 0.060–0.100 inches formed throughout substantial portions of said substantially planar perching surface, said perching openings configured to support claws of small birds while perching during feeding; and
   (c) a second set of several feeding apertures formed within said perching surface, each feeding aperture of said second set being considerably larger than openings of said first set, to make it very easy for said small birds to feed to thus maintain their presence, and yet small enough to prevent substantial waste of birdseed during feeding.

11. The small bird feeder of claim 10 wherein each feeding aperture has a major dimension of between 0.145 and 0.165 inches.

12. The small bird feeder of claim 11 wherein each feeding aperture has a major dimension of about 0.160 inches.

13. The small bird feeder of claim 12 wherein said feeding apertures are widely separated from one another to avoid crowding of feeding birds.

14. The small bird feeder of claim 13 wherein said feeding apertures are centrally positioned upon said planar perching surface.

15. The small bird feeder of claim 11 wherein said feeding apertures are widely separated from one another to avoid crowding of feeding birds.

16. The small bird feeder of claim 15 wherein said feeding apertures are centrally positioned upon said planar perching surface.

17. A thistle seed small bird feeder for feeding small birds of the finch family comprising:
   (a) a plastic mesh sack for containing thistle seeds, having a given length and width, and a broad roomy substantially planar perching surface enabling simultaneous viewing of a substantial number of small feeding birds and a depth far smaller than said length or width or said small bird feeder, for offering large amounts of accessible thistle seeds, said substantially planar perching surface having
   (b) a first set of numerous small rectangular perching openings having dimensions of about 0.035–0.045 inches or alternatively dimensions of about 0.060–0.100 inches, formed throughout substantial portions of said substantially planar perching surface, configured to support perching of said small birds of the finch family thereon during feeding;
   (c) a second set of several feeding aperture formed within said perching surface, each feeding aperture of said second set being considerably larger than openings of said first set, to make it very easy for said small birds to feed to thus maintain their presence, and yet small enough to prevent substantial waste of birdseed during feeding.

18. The small bird feeder of claim 17 wherein each feeding aperture has a major dimension of between 0.145 and 0.165 inches.

19. The small bird feeder of claim 18 wherein each feeding aperture has a major dimension of about 0.160 inches.

20. The small bird feeder of claim 18 including an elongated rectangular movable closure member seated across a top portion of said plastic mesh sack, enabling perching of birds thereon.

* * * * *